(12) United States Patent
Wiggs

(10) Patent No.: US 6,932,149 B2
(45) Date of Patent: Aug. 23, 2005

(54) INSULATED SUB-SURFACE LIQUID LINE DIRECT EXPANSION HEAT EXCHANGE UNIT WITH LIQUID TRAP

(76) Inventor: B. Ryland Wiggs, 425 Sims La., Franklin, TN (US) 37069

(*) Notice: Subject to any disclaimer, the term of this patent is extended or adjusted under 35 U.S.C. 154(b) by 94 days.

(21) Appl. No.: 10/251,190

(22) Filed: Sep. 20, 2002

(65) Prior Publication Data
US 2004/0129408 A1 Jul. 8, 2004

(51) Int. Cl.[7] .................................................. F28B 3/00
(52) U.S. Cl. ......................................... 165/45; 62/260
(58) Field of Search ............................. 165/45; 62/260, 62/527; 166/57, 302; 73/152.13, 152.33

(56) References Cited

U.S. PATENT DOCUMENTS

| | | | | |
|---|---|---|---|---|
| 2,503,456 A | * | 4/1950 | Smith ........................... | 62/260 |
| 4,257,239 A | * | 3/1981 | Partin et al. ................ | 62/238.7 |
| 4,741,388 A | | 5/1988 | Kuroiwa | |
| 5,461,876 A | | 10/1995 | Dressler | |
| 5,477,914 A | * | 12/1995 | Rawlings ...................... | 165/45 |
| 5,533,355 A | * | 7/1996 | Rawlings ...................... | 62/260 |
| 5,560,220 A | * | 10/1996 | Cochran ....................... | 62/260 |
| 5,561,985 A | * | 10/1996 | Cochran ....................... | 62/260 |
| 5,623,986 A | | 4/1997 | Wiggs | |
| 5,706,888 A | * | 1/1998 | Ambs et al. ................. | 165/155 |
| 5,816,314 A | | 10/1998 | Wiggs et al. | |
| 5,946,928 A | | 9/1999 | Wiggs | |
| 6,751,974 B1 | * | 6/2004 | Wiggs ........................... | 62/260 |

* cited by examiner

Primary Examiner—Terrell McKinnon
(74) Attorney, Agent, or Firm—Waddey & Patterson; Mark J. Patterson

(57) ABSTRACT

A direct expansion geothermal heat exchange unit, which can be placed in sub-surface ground and/or water, consisting of at least one insulated refrigerant liquid/fluid line, with a liquid trap at the bottom of the liquid/fluid line, with at least one un-insulated refrigerant vapor/fluid line operatively connected to the insulated liquid/fluid line at a point above the liquid trap, where the un-insulated vapor/fluid line is in thermal contact with its adjacent sub-surface surrounding elements by means of a heat conductive fill material inserted as necessary to fill any void space, in any borehole or excavated area, between the vapor/fluid line and its respective adjacent sub-surface surroundings.

13 Claims, 2 Drawing Sheets

INSULATED SUB-SURFACE LIQUID LINE DIRECT EXPANSION HEAT EXCHANGE UNIT WITH LIQUID TRAP

A portion of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

BACKGROUND OF THE INVENTION

The present invention relates to an improved sub-surface, or in-ground/in-water, heat exchange apparatus for use in association with any heating/cooling system utilizing sub-surface heat exchange elements as a primary or supplemental source of heat transfer, as well as to improved methods of installing direct expansion sub-surface heat exchange tubing.

Ground source/water source heat exchange systems typically utilize fluid-filled closed loops of tubing buried in the ground, or submerged in a body of water, so as to either absorb heat from, or to reject heat into, the naturally occurring geothermal mass and/or water surrounding the buried or submerged tubing. Water-source heating/cooling systems typically circulate water, or water with anti-freeze, in plastic underground geothermal tubing so as to transfer heat to or from the ground, with a second heat exchange step utilizing a refrigerant to transfer heat to or from the water, and with a third heat exchange step utilizing an electric fan to transfer heat to or from the refrigerant to heat or cool interior air space.

Direct expansion ground source heat exchange systems, where the refrigerant transport lines are placed directly in the sub-surface ground and/or water, typically circulate a refrigerant fluid, such as R-22, in sub-surface refrigerant lines, typically comprised of copper tubing, to transfer heat to or from the sub-surface elements, and only require a second heat exchange step to transfer heat to or from the interior air space by means of an electric fan. Consequently, direct expansion systems are generally more efficient than water-source systems because of fewer heat exchange steps. Further, because copper is a better heat conductor than most plastics, and since the refrigerant fluid circulating within the copper tubing of a direct expansion system generally has a greater temperature differential with the surrounding ground than the water circulating within the plastic tubing of a water-source system, generally, less excavation and drilling is required, and installation costs are lower, with a direct expansion system than with a water-source system.

While most in-ground/in-water heat exchange designs are feasible, various improvements have been developed intended to enhance overall system operational efficiencies. Several such design improvements are taught in U.S. Pat. No. 5,623,986 to Wiggs, and in U.S. Pat. No. 5,816,314 to Wiggs, et al., the disclosures of which are incorporated herein by reference. These prior designs basically teach the utilization of a spiraled fluid supply line subjected to naturally surrounding geothermal temperatures, with a fully insulated fluid return line. However, because only the fluid return line is insulated, and because both the supply and return lines are all the same size, without a dedicated smaller-sized refrigerant liquid/fluid transport line and a dedicated larger-sized refrigerant vapor/fluid transport line so as to facilitate appropriate refrigerant supply and return capacity in a deep well (greater than 100 feet deep) direct expansion application, these prior designs are intended for a near-surface (within about 25 to 100 feet of the surface) direct expansion system application, when operating in a reverse cycle mode. Further, these prior art designs do not provide for a dedicated liquid/fluid line trap, in conjunction with a dedicated liquid line and a dedicated vapor line, so as to assist in preventing refrigerant vapor from migrating into the refrigerant liquid line and decreasing system operational efficiencies.

Other vertically oriented geothermal heat exchange designs are disclosed by U.S. Pat. No. 5,461,876 to Dressler, and by U.S. Pat. No. 4,741,388 to Kuriowa. Dressler's '876 patent teaches the utilization of several designs of an in-ground fluid supply and return line, with both the fluid and supply lines shown as being the same size, and not distinguished in the claims, but neglects to insulate either the fluid return line or the fluid supply line, thereby subjecting the heat gained or lost by the circulating fluid to a "short-circuiting" effect as the supply and return lines come into close proximity with one another at various heat transfer points. Dressier also discloses the alternative use of a pair of concentric tubes, with one tube being within the core of the other, with the inner tube surrounded by insulation or a vacuum. While this multiple concentric tube design reduces the "short-circuiting" effect, it is practically difficult to build and maintain and could be functionally cost-prohibitive, and it does not have a dedicated liquid line and a dedicated vapor line with a liquid line trap. Kuriowa's preceding '388 patent is similar to Dressler's subsequent spiral around a central line claim, but better, because Kuriowa insulates a portion of the return line, via surrounding it with insulation, thereby reducing the "short-circuiting" effect. However, Kuriowa does not have a dedicated liquid line and a dedicated vapor line with a liquid line trap. The lowermost fluid reservoir, claimed by Kuriowa in all of his designs, can work in a water-source geothermal system, but can be functionally impractical in a direct expansion sub-surface system, potentially resulting in system operational refrigerant charge imbalances, compressor oil collection/retention problems, accumulations of refrigerant vapor pockets due to the extra-large interior volume, and the like. Kuriowa also shows a concentric tube design preceding Dressler's, but it is subject to the same problems as Dressler's. Further, both the Dressler and Kuriowa designs are impractical in a reverse-cycle, deep well, direct expansion system operation since neither of their primary designs provide for, or claim, an insulated smaller sized liquid line and an un-insulated larger sized vapor line, which are necessary to facilitate the system's most efficient operational refrigerant charge and the system's compressor's efficient refrigerant supply and return capacities.

Generally, a design which insulates the supply line from the return line and still permits both lines to retain natural geothermal heat exchange exposure, such as a thermally exposed, centrally insulated, geothermal heat exchange unit, as taught by Wiggs in U.S. patent application Ser. No. 10/127,517, which is incorporated herein by reference, would be preferable over non-insulated lines and over designs which insulate a portion of one sub-surface line. However, while the device in Wiggs' '517 application is an improvement over prior art, in a sub-surface soil application, it could still be subject to some minor short-circuiting effects and to some potentially adverse vapor formation in the un-insulated liquid line at undesirable locations or times.

In a direct expansion system, the supply and return refrigerant lines may be defined depending on whether the refrigerant transport line is supplying refrigerant to the compressor unit from the ground, i.e. a supply line, or is returning refrigerant from the compressor to the ground, i.e. a return line. Conversely, the operatively connected refrigerant transport line supplying refrigerant to, or returning refrigerant from, the interior air handler, which is also operatively connected via refrigerant transport lines to the compressor unit, would have the opposite designation, being designated as a return line from the air handler in the heating mode, and as a supply line to the air handler in the cooling mode, as is well understood by those skilled in the art. In the heating mode the ground is the evaporator, and in the cooling mode, the ground is the condenser.

For purposes of this present invention, supply and return lines are defined based upon whether, in the heating mode, warmed refrigerant vapor is being supplied to the system's compressor, after acquiring heat from the sub-surface elements, in which event the larger interior diameter vapor/fluid line is the supply line and evaporator, and the smaller interior diameter liquid/fluid line operatively connected to the interior air handler is the return line; or whether, in the cooling mode, hot refrigerant vapor is being returned to the sub-surface elements from the system's compressor, in which event the larger interior diameter vapor/fluid line is the return line and condenser, and the smaller interior diameter liquid/fluid line is the supply line, via supplying cooled liquid refrigerant to the interior air handler.

None of the prior art described above addresses an improved means of designing a direct expansion system for a reverse-cycle heating/cooling system operation via insulating only one smaller interior diameter line, designed primarily for liquid/fluid refrigerant transport, which smaller line may be utilized as a return line in the heating mode and as a supply line in the cooling mode, and of not insulating at least one, or two or more combined, larger interior diameter lines, designed primarily for vapor/fluid transport, which can provide expanded surface area thermal heat transfer as supply lines in the heating mode and as return lines in the cooling mode. While at least two, larger combined interior diameter, vapor/fluid refrigerant transport lines, operatively connected to one, smaller interior diameter, liquid/fluid refrigerant transport line would generally be preferable because of the resulting expanded heat transfer surface contact area, instances may arise where only one, larger interior diameter, vapor/fluid refrigerant line, operatively connected to one, smaller interior diameter, liquid/fluid refrigerant line could also be preferable, or where a larger interior diameter vapor/fluid refrigerant line is spiraled around a centrally located, insulated, smaller diameter liquid/fluid refrigerant line could be preferable.

An example of where only one, larger interior diameter, vapor/fluid refrigerant line, operatively connected to only one, smaller interior diameter, liquid/fluid refrigerant line could be preferable would be in a near-surface horizontal, or less than vertical, application. In such an application, where surface land area was sufficient, the expense of well-drilling, or the expense of a large surface area excavation, could be avoided by simply excavating a trench, several inches to one foot in width and about three to four feet in depth below the maximum frost/heat line, via a backhoe or a trenching machine, and simply installing/inserting the lines and backfilling. In such a simplified application, which also eliminates the necessity to connect multiple, often ten or more, heat transfer lines in a horizontal wide-area matrix, as with conventional near-surface direct expansion systems, a liquid trap should also be installed at the point, within the sub-surface location, that is below the point at the end of the refrigerant lines where the insulated liquid line connects to the un-insulated vapor line.

Where a close to zero-tolerance short-circuiting effect is desirable, and where the time and expense of constructing other designs, such as a concentric tube within a tube, or a spiraled single fluid return line and single fluid supply line of the same sized interior diameters, could be financially, or functionally and/or efficiently, prohibitive in a sub-surface direct expansion application, and where the thermal exposure area of a single geothermal heat transfer line, or tube, could be too centralized and too heat transfer restrictive, a system design improvement would be preferable which incorporated a cost-effective installation method, capable of operating in a reverse-cycle mode in a sub-surface direct expansion application, with close to zero-tolerance short-circuiting effect, with expanded sub-surface heat transfer surface area capacities, and with a liquid refrigerant trap means at the bottom of the sub-surface heat exchange lines to assist in preventing refrigerant vapor migration from the refrigerant vapor line into the refrigerant liquid line.

SUMMARY OF THE INVENTION

It is an object of the present invention to further enhance and improve the efficiency and installation cost functionality of prior art direct expansion geothermal heat exchange designs. This is accomplished by means of providing an insulated, sub-surface, smaller interior diameter, refrigerant transport line, or tube, designed to transport liquid/fluid refrigerant in a sub-surface environment, which is operatively connected to at least one, larger interior diameter, and preferably two combined larger interior diameter, un-insulated, sub-surface refrigerant vapor/fluid transport lines, or tubes, which vapor lines are in direct thermal contact with sub-surface, heat-conductive, elements.

It is an additional object of this invention to provide a liquid refrigerant trap at the lowermost segment of the operatively connected sub-surface refrigerant transport lines.

To accomplish these preferable objectives, the present invention includes fully insulated, smaller interior diameter refrigerant fluid transport line, which insulated fluid transfer line extends the full depth and/or length of the geothermal fluid transfer unit, generally placed within a borehole, which line is primarily designed to transport a refrigerant liquid/fluid, and which line is operatively connected to at least one, and preferably two, adjacent, non-insulated, thermally exposed, larger combined interior diameter, refrigerant fluid transport lines, where the larger combined interior diameter refrigerant transport lines are primarily designed to transport a heat-conductive refrigerant vapor/fluid, and where the larger interior diameter heat transfer lines are in direct thermal contact with the sub-surface elements, whether soil and/or rock and/or clay and/or sand and/or water and/or anti-freeze and/or thermal grout, etc. This method provides ease of installation, reduced installation costs, and more evenly distributes heat transfer, with more heat transfer contact surface area than a typical single heat transfer line, within either a near surface, or a deep well, direct expansion sub-surface excavation or borehole, all while thermally insulating the smaller interior diameter liquid/fluid refrigerant transport line so as to avoid virtually all potential short-circuiting in-efficiencies, whether operating in the supply or return modes, in a reverse-cycle system.

A borehole and/or well in excess of 100 feet deep is herein termed a "deep well" system. As a design example, in a vertically oriented, or angled, four-ton system capacity, deep well borehole, an insulated liquid/fluid refrigerant transport tube, such as a ½" O.D. copper refrigerant tube, is fully insulated along its entire length, approximately 500 feet for example. The bottom end of the liquid/fluid refrigerant transport tube is operatively connected to at least one, and preferably two, un-insulated vapor/fluid refrigerant transport tubes, such as two respective ⅞" O.D. copper refrigerant tubes, also of about 500 feet in respective length, for example. The insulated liquid/fluid refrigerant transport line has a smaller interior diameter than the un-insulated, larger interior diameter, one or combined, vapor/fluid refrigerant transport lines. For a smaller system design, such as a two-ton capacity system for example, the insulated refrigerant liquid/fluid transport line might consist of a ⅜" O.D. copper refrigerant tube, and two larger combined interior diameter vapor/fluid refrigerant transport lines might respectively consist of a ½" O.D. copper refrigerant tube, for example. The at least one, and preferably two, vapor/fluid refrigerant transport tubes are in direct thermal contact with the sub-surface elements, which elements may consist of one or more of earth, rock, clay, sand, water, anti-freeze, water and anti-freeze, fluid, thermal grout (such as a thermal grout 85 mixture), or the like.

This two-sized, smaller interior diameter insulated liquid line and larger interior un-insulated vapor line, refrigerant transport tubing design permits reverse-cycle operation via an insulated, smaller interior diameter, supply refrigerant line in the summer, and via the same insulated, smaller diameter, return refrigerant line in the winter. In such a reverse-cycle direct expansion heating/cooling application, the smaller diameter liquid/fluid transport line should always be fully, or mostly, insulated, while the larger diameter vapor/fluid transport line, or lines, would always be thermally exposed and never insulated, except for insulation at very near-surface locations within the frost line. In such a system, the smaller interior diameter, insulated, liquid/fluid line would act as the system return line in the heating mode, returning the cooled refrigerant from the interior air handler to the ground/water to be warmed as the refrigerant fluid passes through the vapor/fluid line, or lines, on the way to the system's compressor, and would act as the system supply line in the cooling mode, supplying the refrigerant fluid, cooled by the ground/water as the refrigerant passes through the vapor/fluid line, or lines, on the way to the system's interior air-handler, while, conversely, the un-insulated, at least one, and preferably two, larger combined interior diameter, vapor/fluid lines would act as the system supply lines in the heating mode, and would act as the system return lines in the cooling mode. Importantly, use of at least two sub-surface, thermally exposed, vapor/fluid lines within a borehole generally provides more thermal heat transfer surface area contact than only one vapor/fluid line would provide, and generally permits a better distribution of the heat conductive vapor/fluid lines within the borehole, so as to more evenly and efficiently distribute heat transfer to adjacent geothermal surroundings. However, if circumstances warrant, the smaller interior diameter liquid/fluid refrigerant transport line could be insulated with the larger interior diameter refrigerant transport line spiraled around the exterior of the insulation, similar to the configuration as shown in the aforesaid Wiggs' '986 patent and in the aforesaid Wiggs, et al, '314 patent, except that instead of a uniformly sized line, with only the return line insulated, as shown in the said prior patents, the centrally located, insulated, line would be the smaller interior diameter refrigerant transport line, for use as both a supply and a return line in a reverse-cycle system operation, and the line spiraled around the insulation would be the larger interior diameter refrigerant transport line.

For a direct expansion system, the present invention will additionally facilitate ease of system installation, with the one, and preferably at least two, refrigerant vapor/fluid lines simply being attached to the exterior of the insulation surrounding the central insulated refrigerant liquid/fluid line, typically with each of two respective lines attached on opposite sides of the insulated liquid/fluid line for better heat transfer distribution, with the entire assembly then being lowered into the borehole. A good method of insulating the smaller interior diameter liquid/fluid refrigerant line is to surround the line with rubatex insulation, or the like, and then to place the rubatex insulated line within a plastic pipe. The plastic pipe will enhance insulation properties, will provide a firm support to attach the larger interior diameter vapor/fluid refrigerant transport line, or lines, to, and will help to prevent the rubatex from tearing as the assembly is lowered into a deep well borehole. In the heating mode, the sub-surface's natural geothermal heat content operates as the evaporator, with the cold liquid refrigerant flowing from the interior air handler into the sub-surface surrounding via the smaller interior diameter liquid/fluid return line, and with the warmed refrigerant vapor flowing out through the larger interior diameter vapor/fluid supply line, or lines to the compressor unit. In the cooling mode, the ground's natural geothermal heat content operates as the condenser, with the hot refrigerant vapor flowing from the compressor unit into the larger interior diameter vapor/fluid return line, or lines, into the sub-surface surroundings, and with the cooled liquid refrigerant flowing out from the smaller interior diameter liquid/fluid supply line into the interior air handler.

In a deep well direct expansion application, beyond 100 feet deep, or in a near-surface excavated trench area application, beyond 50 feet in length, an oil separator, well known to those skilled in the art, should be attached to the system's compressor unit so as to prevent loss of internal compressor lubricating oil into the low geothermal line, or lines, at the bottom of the borehole or at the end of the excavated area. As the use of an oil-separator to prevent loss of compressor lubrication into refrigerant fluid supply and return lines is well known, this aspect is not shown in the drawings. Other customary direct expansion refrigerant system apparatus and materials would be utilized in a direct expansion system application, including a receiver, a thermal expansion valve, an accumulator, and an air-handler, for example as described in U.S. Pat. No. 5,946,928 to Wiggs, which is incorporated herein by reference, all of which are well-known to those in the art and are therefore not shown herein.

Further, in a direct expansion application, the lower segment of the liquid/fluid refrigerant transport line should be bent or configured in a U shape, or other non-restrictive shape, and coupled to the at least one, and preferably two, vapor/fluid refrigerant lines approximately 1 to 3 feet above the base of the borehole, so as to provide a liquid refrigerant trap. This will assist in preventing excessive refrigerant vapor bubbles from migrating into the primarily liquid transport line, and will additionally act as an oil trap for any oil migrating from the compressor and/or oil separator unit, providing some assistance in mixing the oil, which is also in a liquid state, back into the returning refrigerant and eventually returning it back to the compressor.

As a safety precaution against refrigerant line leaks, or as a means of operating multiple heating/cooling systems from only one borehole, the subject invention may be constructed so as to provide more than one insulated smaller interior diameter liquid/fluid refrigerant lines in a single borehole, but where there is at least one, and preferably at least two, un-insulated larger interior diameter vapor/fluid refrigerant lines operatively connected to each respective single insulated smaller interior diameter liquid/fluid refrigerant lines within the same borehole.

Generally, the length and the depth of the insulated smaller interior diameter liquid/fluid refrigerant transport line should extend to the same length and depth of the operatively connected un-insulated larger interior diameter vapor/fluid refrigerant transport line, or lines, except for the slight additional length of the insulated liquid/fluid refrigerant transport line occasioned by the U bend, or liquid trap, at the bottom of the borehole, or at the end of the excavation, where the at least two different interior diameter sized lines are operatively connected. Generally, the said at least two different, operatively connected, interior diameter sized lines should always extend to at least 75% of the length and the depth of one another to prevent system operational inefficiencies.

The subject invention may be utilized as an individual unit, or by means of multiple units connected by tubing in series or in parallel by means of common fluid supply and return refrigerant lines, to increase operational efficiencies and/or to reduce installation costs in a number of applications, such as in a conventional geothermal direct expansion heat pump system, or as a supplement to a conventional air-source heat pump system or other conventional heating/cooling system. The invention may be utilized to assist in efficiently heating or cooling air by means of a forced air heating/cooling system, or to assist in efficiently heating or cooling water in a hydronic heating/cooling system.

BRIEF DESCRIPTION OF THE DRAWINGS

There are shown in the drawings embodiments of the invention as presently preferred. It should be understood, however, that since any number of insulated smaller interior diameter liquid/fluid refrigerant transport lines could be utilized and respectively operatively connected, in a variety of arrangements to any number of larger interior diameter, un-insulated, vapor/fluid refrigerant transport lines installed in a variety of arrangements, such as parallel, spiraled, or the like, and since the geothermal heat exchange unit described can be connected to other such units in one of series or in parallel, the invention is not limited to the simple exemplary arrangements and instrumentalities shown in the drawings, which demonstrate a single insulated smaller interior diameter liquid/fluid refrigerant transport line, with a bottom liquid trap, operatively connected to two, un-insulated, combined larger interior diameter, vapor/fluid refrigerant transport lines, and which demonstrate a single un-insulated larger interior diameter vapor/fluid refrigerant transport line spiraled around, and operatively connected to, an insulated smaller interior diameter liquid/fluid transport line, with a bottom liquid trap, wherein.

DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
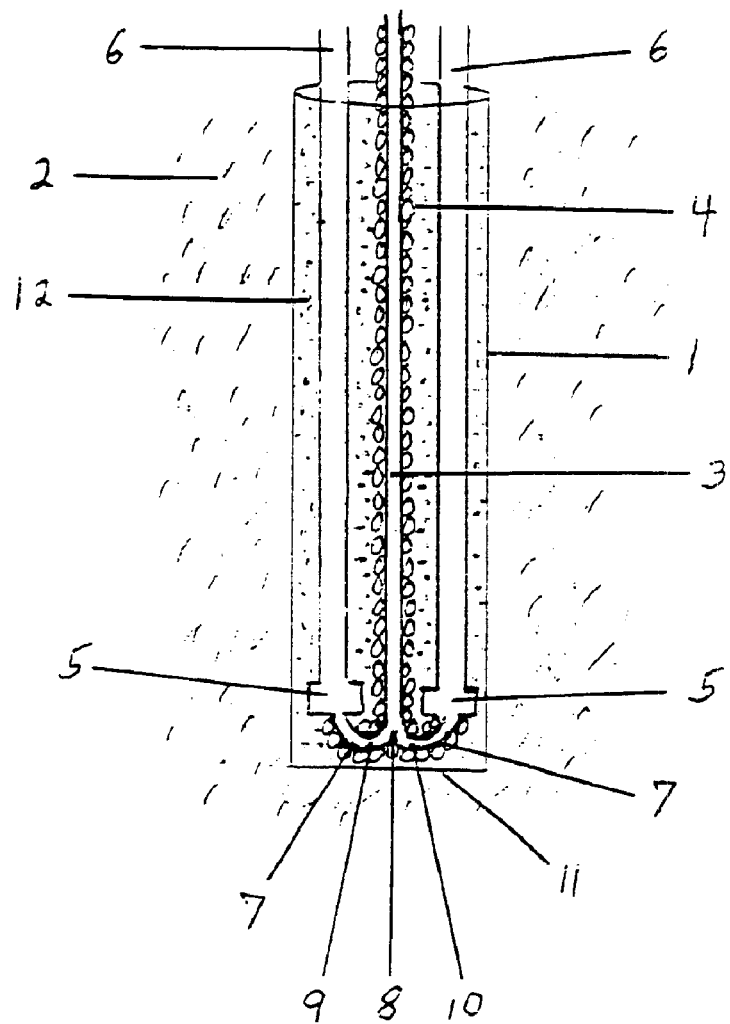
FIG. 1 is a side view of a first embodiment of the invention, showing a borehole in the ground with a smaller interior diameter insulated refrigerant liquid/fluid transport line centrally located between two combined larger diameter un-insulated refrigerant vapor/fluid transport lines, where the two vapor/fluid lines are operatively connected to the one liquid/fluid line at a point above a U bend, or a liquid trap, in the liquid/fluid line near the bottom of the borehole, or deep well, and where both respective spaces in the borehole containing the respective lines are filled with a heat conductive fill material.

Referring now to the drawings in detail, where like numerals refer to like parts or elements, there is shown in FIG. 1 a side view of a borehole 1 in the ground 2 with a liquid/fluid refrigerant transport line, or tube, 3, surrounded by insulation 4, operatively connected at a distal end by couplings 5 to the distal ends of two un-insulated vapor/fluid refrigerant transport lines, or tubes, 6 at a point above two respective U bend liquid traps 7 in the liquid/fluid line 3, which is divided at point 8 into a first liquid fluid line segment 9 and a second liquid fluid line segment 10, near the bottom 11 of the borehole 1. The liquid/fluid line 3 and the vapor/fluid line 6 will vary in size, depending on system design capacities, but the interior diameter of the liquid/fluid line 3 will always be smaller than the combined interior diameters of the vapor/fluid lines 6. For example, in a direct expansion reverse cycle system design, the liquid/fluid line 3 may be a ½ inch O.D. liquid refrigerant transport copper tube, and the vapor/fluid return line 6 may be a ⅞ inch O.D. vapor refrigerant transport copper tube. In the cooling mode, the direction of the refrigerant flow in the sub-surface refrigerant transport lines, 3 and 6, simply reverses direction from that of the refrigerant flow in the heating mode.

In a preferred embodiment, the insulated liquid/fluid line 3 and uninsulated vapor/fluid lines 6 are aligned and the uninsulated vapor/fluid line 6 extends within the borehole 1, or in another sub-surface location, along at least 75% of the depth and length of the insulated liquid/fluid line 3 within the borehole 1, for example.

The insulation 4 may be composed of any material or design exhibiting adequate thermal insulation properties, such as rubatex and/or hollow plastic tubing, or the like. The respective portions of the borehole 1, not containing the insulated liquid/fluid line 3 and the vapor/fluid lines 6, are respectively filled with a heat conductive fill material 12, such as cement, concrete, a fluid, a gel, a liquid, crushed stone, pea gravel, powdered stone, thermal grout, or the like. Because the vapor/fluid lines 6 are respectively in direct thermal contact with heat conductive fill material 12, heat is transferred to or from the ground 2, located directly adjacent to each side of the borehole 1, through the heat conductive fill material 12 on each respective side of the vapor/fluid lines 6, to or from the refrigerant fluid within the vapor/fluid lines 6, thereby effecting the desired geothermal heat transfer.

Figure 2:
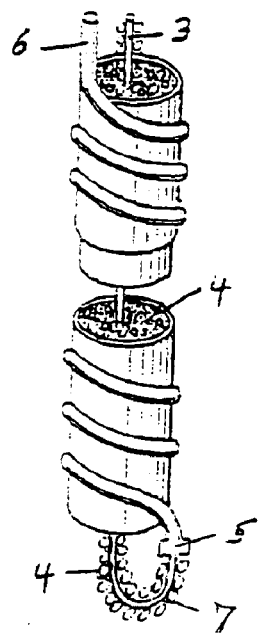
FIG. 2 is a side view of an alternative embodiment of the invention where a larger interior diameter vapor/fluid line spirals around a smaller interior diameter, insulated, liquid/fluid line, where the vapor/fluid line is operatively connected to the insulated liquid/fluid line at a point above a U bend, or a liquid trap, in the liquid/fluid line near the bottom of the borehole, or deep well, and where both respective spaces in the borehole containing the respective lines are filled with a heat conductive fill material.

FIG. 2 is a side view of an optional design where a larger interior diameter vapor/fluid line 6 spirals around a smaller interior diameter liquid/fluid line 3, which is insulated 4, where the distal end of the vapor/fluid line 6 is operatively connected by means of a coupling 5 to the distal end of insulated liquid/fluid line 3 at a point above a U bend liquid trap 7 in the liquid/fluid line 3.

Figure 3:
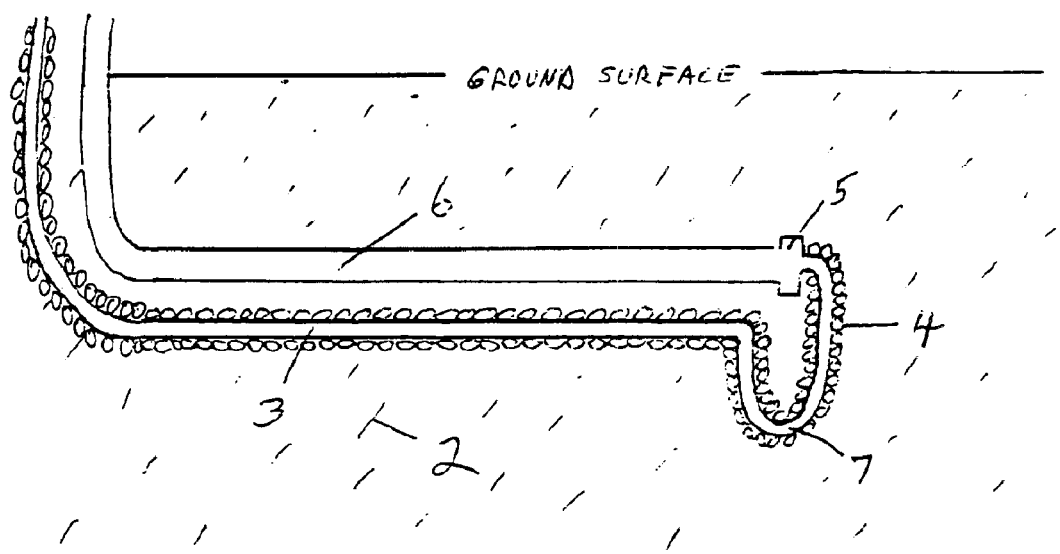
FIG. 3 is a side view of an alternative embodiment of the invention where an insulated, smaller interior diameter, liquid/fluid line is operatively connected to an un-insulated, larger interior diameter, vapor/fluid line at a point above a U bend, or a liquid trap, at the end of a near-surface trenched excavation area.

FIG. 3 is a side view of an optional design where a smaller interior diameter liquid/fluid line 3, which is insulated 4, is inserted in a horizontal fashion in the a sub-surface location, e.g., ground 2, where the distal end of the vapor/fluid line 6 is operatively connected by means of a coupling 5 to the distal end of insulated liquid/fluid line 3 at a point above a vertically oriented U bend liquid trap 7 in the liquid/fluid line 3.

Although particular embodiments of a system and method to enhance the operational efficiencies and installation cost functionality of geothermal heat exchange installations are described, it is not intended that such description be construed as limiting the scope of this invention, except as set forth in the following claims:

What I claim is:

1. A geothermal heat exchange unit comprising:
   at least one insulated refrigerant fluid transport line having an inner diameter, with at least a lower portion and lower segment of the at least one insulated refrigerant fluid transport line positioned in a sub-surface location;
   a first un-insulated fluid transport line having a distal end operatively coupled to the lower segment of the least one insulated fluid transport line in the sub-surface location, with at least the lower portion of the first un-insulated fluid transport line in thermal contact with sub-surface material in the sub-surface location;
   wherein the first un-insulated fluid transport line has an inner diameter that is larger than the inner diameter of the at least one insulated refrigerant fluid transport line;
   layer of thermal insulation surrounding the lower portion of the at least one insulated refrigerant fluid transport line; and
   wherein the layer of thermal insulation is in physical contact with the sub-surface material.

2. A geothermal heat exchange unit comprising:
   at least one insulated refrigerant fluid transport line having an inner diameter, with at least a lower portion and lower segment of the at least one insulated refrigerant fluid transport line positioned in a sub-surface location;
   a first un-insulated fluid transport line having a distal end operatively coupled to the lower segment of the least one insulated fluid transport line in the sub-surface location, with at least the lower portion of the first un-insulated fluid transport line in thermal contact with sub-surface material in the sub-surface location;
   wherein the first un-insulated fluid transport line has an inner diameter that is larger than the inner diameter of the at least one insulated refrigerant fluid transport line; and
   wherein the lower segment of the at least one insulated fluid transport line comprises a first liquid trap operatively connected to the distal end of the first un-insulated fluid transport line at a point within the sub-surface location that is above the first liquid trap.

3. The geothermal heat exchange unit of either claim 1 or claim 2 where the first un-insulated fluid transport line extends at least seventy-five percent of the length and the depth of the insulated fluid transport line within the sub-surface location.

4. The geothermal heat exchange unit of either of claim 1 or claim 2 further comprising a plurality of un-insulated fluid transport lines each having respective distal ends operatively coupled to the at least one un-insulated fluid transport line by a second fluid trap.

5. The geothermal heat exchange unit of claim 1 wherein the inner diameter of the at least one insulated refrigerant fluid transport line and the inner diameter of the first un-insulated fluid transport line are adapted for operative connection to a closed-loop direct expansion heat pump system.

6. The geothermal heat exchange unit of either claim 1 or claim 2 wherein the first un-insulated fluid transport line comprises a spiral tube positioned around the at least one insulated fluid transport line.

7. The geothermal heat exchange unit of claim 2 wherein the first liquid trap comprises a U-shaped bend in the lower segment of the least one insulated fluid transport line.

8. A geothermal heat exchange arrangement comprising:
   a sub-surface borehole;
   an insulated refrigerant liquid/fluid transport line extending vertically within the borehole;
   an un-insulated refrigerant vapor/fluid transport line extending vertically within the borehole proximate the insulated refrigerant liquid/fluid transport line;
   the insulated refrigerant liquid/fluid transport line having an inner diameter that is smaller than an inner diameter of the un-insulated refrigerant vapor/fluid transport line;
   the insulated refrigerant liquid/fluid transport line further comprising a U-shaped liquid trap connecting the insulated refrigerant liquid/fluid transport line to the un-insulated refrigerant vapor/fluid transport line proximate a bottom end of the borehole; and
   heat conductive fill material in thermal contact with the un-insulated refrigerant vapor/fluid transport line.

9. The geothermal heat exchange arrangement of claim 8 wherein the un-insulated refrigerant vapor/fluid transport line comprises a plurality of vertical tubes.

10. The geothermal heat exchange arrangement of claim 8 wherein the un-insulated refrigerant vapor/fluid transport line comprises a spiral tube.

11. A geothermal heat exchange arrangement comprising:
    an insulated refrigerant liquid/fluid transport line extending substantially horizontally within a sub-surface location;
    an un-insulated refrigerant vapor/fluid transport line extending substantially horizontally within the sub-surface location proximate the insulated refrigerant liquid/fluid transport line;
    the insulated refrigerant liquid/fluid transport line having an inner diameter that is smaller than an inner diameter of the un-insulated refrigerant vapor/fluid transport line;
    the insulated refrigerant liquid/fluid transport line further comprising a vertically-oriented liquid trap connecting a distal end of the insulated refrigerant liquid/fluid transport line to a distal end of the un-insulated refrigerant vapor/fluid transport line; and heat conductive sub-surface material in thermal contact with the un-insulated refrigerant vapor/fluid transport line.

12. The geothermal heat exchange arrangement of claim 11 wherein the un-insulated refrigerant vapor/fluid transport line comprises a plurality of horizontal tubes.

13. The geothermal heat exchange arrangement of claim 11 wherein the un-insulated refrigerant vapor/fluid transport line comprises a spiral tube.

* * * * *